US012297832B2

(12) United States Patent
Watanabe et al.

(10) Patent No.: US 12,297,832 B2
(45) Date of Patent: May 13, 2025

(54) COMPRESSOR WITH CHROMIUM NITRIDE AND TITANIUM NITRIDE LAYERS

(71) Applicant: Carrier Japan Corporation, Tokyo (JP)

(72) Inventors: Norihisa Watanabe, Fuji (JP); Shohei Atobe, Fuji (JP)

(73) Assignee: Carrier Japan Corporation, Tokyo (JP)

( * ) Notice: Subject to any disclaimer, the term of this patent is extended or adjusted under 35 U.S.C. 154(b) by 0 days.

(21) Appl. No.: 18/591,117

(22) Filed: Feb. 29, 2024

(65) Prior Publication Data

US 2024/0200556 A1 Jun. 20, 2024

Related U.S. Application Data

(63) Continuation of application No. PCT/JP2021/032110, filed on Sep. 1, 2021.

(51) Int. Cl.
*F04C 18/356* (2006.01)
*F04C 29/00* (2006.01)

(52) U.S. Cl.
CPC ............ *F04C 18/356* (2013.01); *F04C 29/00* (2013.01); *F04C 2230/91* (2013.01); *F05C 2201/0406* (2013.01); *F05C 2201/0412* (2013.01); *F05C 2203/0813* (2013.01); *F05C 2203/083* (2013.01); *F05C 2203/0847* (2013.01)

(58) Field of Classification Search
CPC .. F04C 2/356; F04C 29/00; F05C 2201/0406; F05C 2203/0813; F05C 2203/083; F05C 2203/0847
See application file for complete search history.

(56) References Cited

U.S. PATENT DOCUMENTS 6,372,369 B1 4/2002 Ito et al.
8,092,201 B2 * 1/2012 Tsukahara ............ F04C 2/3442 418/179

FOREIGN PATENT DOCUMENTS

| | | | |
|---|---|---|---|
| JP | 62-188857 | A | 8/1987 |
| JP | 2001-90835 | A | 4/2001 |
| JP | 2005-155461 | A | 6/2005 |
| JP | 2009-133445 | A | 6/2009 |
| JP | 2011-001897 | A | 1/2011 |
| JP | 6011861 | B2 | 10/2016 |
| WO | WO 2017/138175 | A1 | 8/2017 |

OTHER PUBLICATIONS

Machine Translation of Japanese Patent Publication JP 2005-155461 A; 1st Inventor: Ishikawa: Title: Compressor; Published: Jun. 16, 2005. (Year: 2005).*

(Continued)

*Primary Examiner* — Mary A Davis
(74) *Attorney, Agent, or Firm* — Oblon, McClelland, Maier & Neustadt, L.L.P.

(57) ABSTRACT

A compressor of an embodiment includes a compression mechanism part that compresses a refrigerant in a sealed container. The compression mechanism part includes Cr and includes a first member and a second member which slidingly move relative to each other. The first member has a chromium layer and a nitride layer formed on a base member surface in this order. The nitride layer includes CrN and TiN. Carbide is deposited on a surface of the second member.

4 Claims, 3 Drawing Sheets

(56) References Cited

OTHER PUBLICATIONS

Machine Translation of Japanese Patent Publication JP 2009-133445 A; 1st Inventor: Ogawa: Title: Sliding Member; Published: Jun. 18, 2009. (Year: 2009).*
Machine Translation and Foreign Document for WIPO Publication WO 2017/138175 A1; 1st Inventor: Watanabe; Title: Rotary Compressor and Refrigeration Cycle Device; Published: Aug. 17, 2017. (Year: 2017).*
International Search Report issued Oct. 26, 2021 in PCT/JP2021/032110 filed on Sep. 1, 2021, 2 pages.
Japanese Office Action issued in Japanese Patent Application No. 2023-544866 on Nov. 26, 2024, w/ English Translation, citing document 15 therein.

* cited by examiner

COMPRESSOR WITH CHROMIUM NITRIDE AND TITANIUM NITRIDE LAYERS

CROSS-REFERENCE TO RELATED APPLICATION

This application is a continuation of International Application No. PCT/JP2021/032110, filed Sep. 1, 2021, the entire content of which is incorporated herein by reference.

FIELD

The present invention relates to a compressor.

BACKGROUND

A refrigeration cycle device such as an air conditioning machine or the like uses a compressor such as a refrigerant compressor or the like including a compression mechanism part that suctions and discharges a refrigerant serving as working fluid. For example, heat is likely to be generated on a sliding portion between a front-end surface of a blade of a compressor and an outer peripheral surface or the like of a roller, the refrigerant may pyrolytically decompose. There is a concern that products generated by the heat decomposition of the refrigerant may cause a failure of the compressor. It is known in Japanese Patent No. 6011861 (hereinafter referred to as a "Patent Literature") that anti-oxidant or the like is added to a refrigerant oil for suppressing the generation of reactive products of a refrigerant.

In Patent Literature, although the refrigerant oil for suppressing heat decomposition of the refrigerant has been only discussed, a configuration of a sliding component for reducing heat generation due to sliding of the compressor has not discussed.

DETAILED DESCRIPTION

A compressor of an embodiment has a compression mechanism part that compresses a refrigerant in a sealed container. The compression mechanism part includes chromium and includes a first member and a second member which slidingly move relative to each other. A chromium layer and a nitride layer includes chromium nitride and titanium nitride are formed on a base member surface of the first member in this order, and carbide is deposited on a surface of the second member. The compressor of the embodiment has only to be a compressor having the above features, and other than these features may be employed to a known mode without limitation.

An example of a refrigeration cycle device including the compressor of the embodiment will be described below.

Figure 1:
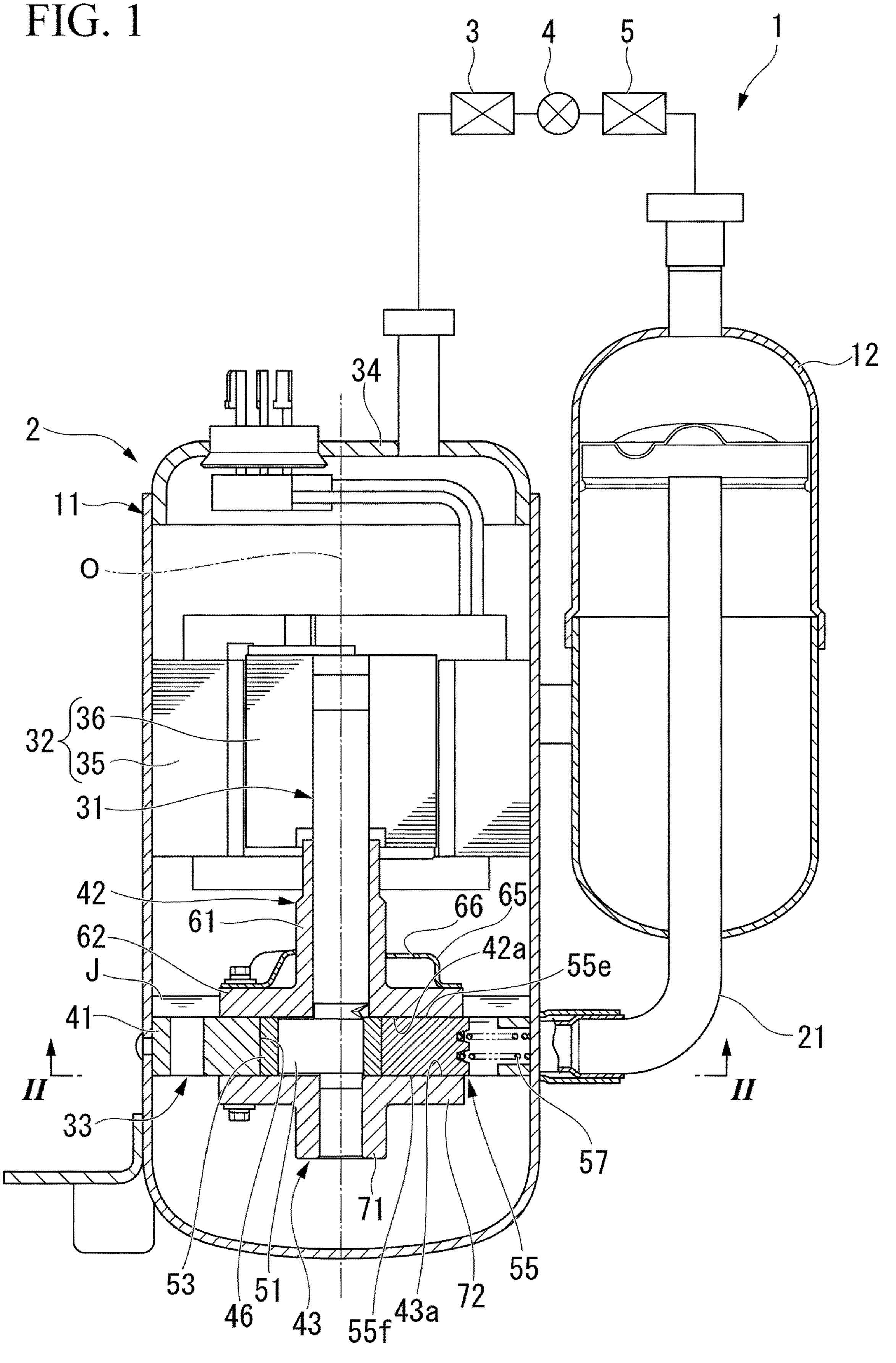
FIG. 1 is a schematic diagram showing an example of a refrigeration cycle device including a compressor of an embodiment.

As shown in FIG. 1, a refrigeration cycle device 1 includes a compressor 2, a condenser 3 serving as a radiator connected to the compressor 2, an expansion device 4 connected to the condenser 3, and an evaporator 5 serving as a heat absorber connected between the expansion device 4 and the compressor 2.

The compressor 2 is a so-called rotary compressor that takes gaseous refrigerant into the inside thereof, compresses it, and thereby generates a high-temperature and high-pressure refrigerant. Note that, the compressor 2 is not limited to rotary type and may be a compressor such as a scroll type, a reciprocating type, a swash plate type, or the like. The condenser 3 dissipates heat from the high-temperature and high-pressure gaseous refrigerant fed from the compressor 2 to convert it into a high-pressure liquid refrigerant. The expansion device 4 reduces a pressure of the high-pressure liquid refrigerant fed from the condenser 3 to convert it into a low-temperature and low-pressure liquid refrigerant. The evaporator 5 evaporates the low-temperature and low-pressure liquid refrigerant fed from the expansion device 4 and converts the low-temperature and low-pressure liquid refrigerant into a low-pressure gaseous refrigerant. In the evaporator 5, when the low-pressure liquid refrigerant is evaporated, evaporation heat is removed from the surroundings and the surroundings are cooled. Note that, the low-pressure gaseous refrigerant that has passed through the evaporator 5 is incorporated into the compressor 2. As mentioned above, in the refrigeration cycle device 1 of the embodiment, the refrigerant circulates while phase change is carried out between the gaseous refrigerant and the liquid refrigerant.

The compressor 2 includes a compressor body 11 and an accumulator 12.

The accumulator 12 is a so-called gas-liquid separator. The accumulator 12 is connected to the compressor body 11 via a suction pipe 21. The accumulator 12 is connected to the evaporator 5 and supplies, to the compressor body 11, only the gaseous refrigerant out of the refrigerant evaporated by the evaporator 5 and the liquid refrigerant not evaporated by the evaporator 5.

The compressor body 11 includes a rotation axis 31, a motor part 32, a compression mechanism part 33, and a sealed container 34 that accommodates the rotation axis 31, the motor part 32, and the compression mechanism part 33. The sealed container 34 is formed in a cylindrical shape and both end portions thereof in the direction of the axis line O are closed. The sealed container 34 accommodates refrigerant oil J therein. Part of the compression mechanism part 33 is immersed in the refrigerant oil J.

The rotation axis 31 is coaxially disposed along the axis line O of the sealed container 34. Note that, in the following explanation, the direction along the axis line O is simply referred to as an axial direction, the direction orthogonal to the axial direction is referred to as a radial direction, and the direction around the axis line O is referred to as a circumferential direction.

The motor part 32 is disposed on a first side in the axial direction in the sealed container 34. The compression mechanism part 33 is disposed on a second side in the axial direction in the sealed container 34. In the following explanation, along the axial direction, the side (first side) on the motor part 32 is referred to as an upper side, and the side (second side) on the compression mechanism part 33 is referred to as a lower side.

The motor part 32 is a so-called inner rotor type DC brushless motor. Specifically, the motor part 32 includes a stator 35 and a rotor 36. The stator 35 is fixed to an inner wall surface of the sealed container 34 by shrinkage fitting or the like. The rotor 36 is fixed to an upper portion of the rotation axis 31 in an inner side of the stator 35 in a state of being spaced apart therefrom at a distance in the radial direction.

The compression mechanism part 33 includes a cylindrical cylinder 41 through which the rotation axis 31 penetrates, and a main bearing 42 and a sub bearing 43 which seal both opening end portions of the cylinder 41 in the axial direction and rotatably support the rotation axis 31. The space formed by the cylinder 41, the main bearing 42, and the sub bearing 43 configures a cylinder chamber 46.

An eccentric portion 51 eccentric with respect to the axis line O in the radial direction is formed at a portion of the rotation axis 31 located in the cylinder chamber 46. A roller 53 is externally fitted onto the eccentric portion 51. The roller 53 is configured to be eccentrically rotatable with respect to the axis line O in accordance with the rotation of the rotation axis 31 while an outer peripheral surface 53*a* thereof is in frictional contact with an inner peripheral surface 41*a* of the cylinder 41 via a refrigerant oil coating.

Figure 2:
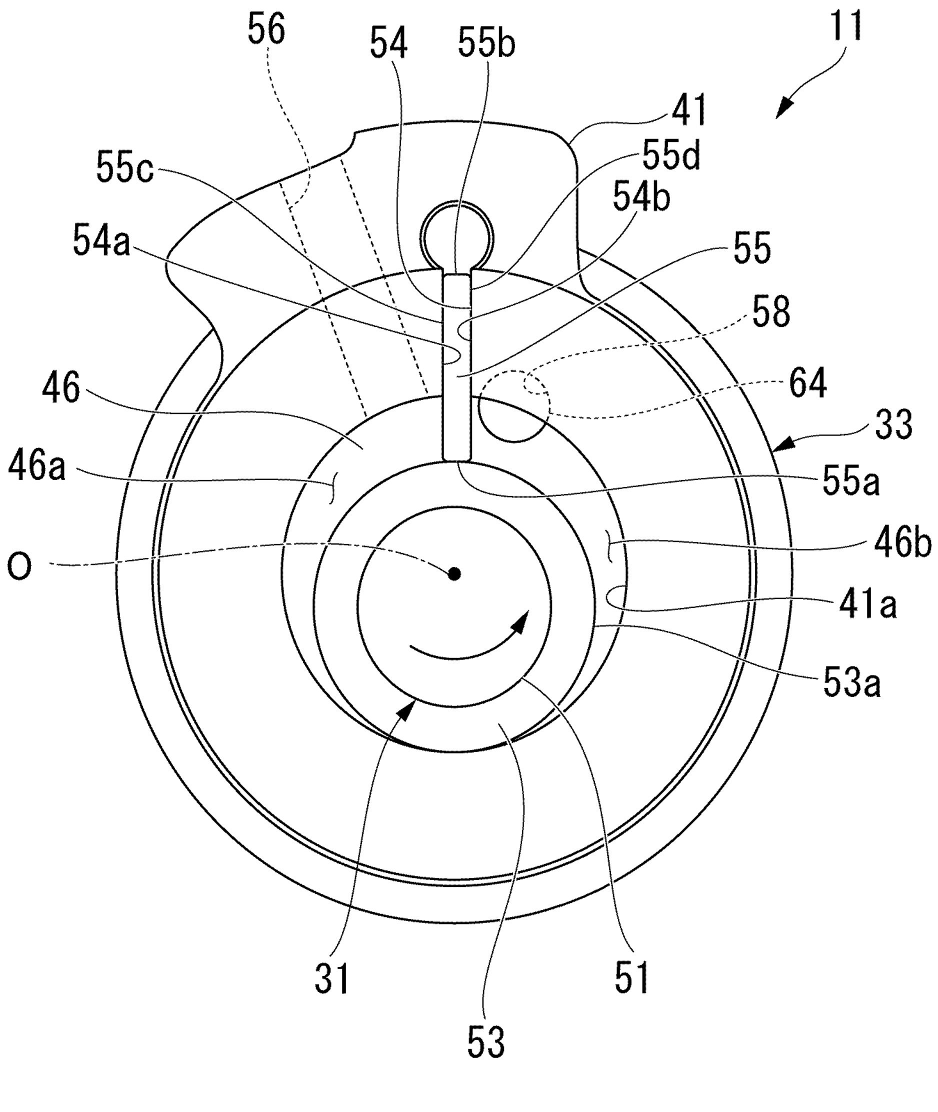
FIG. 2 is a II-II cross-sectional view of the compressor of the refrigeration cycle device of FIG. 1.
Figure 3:
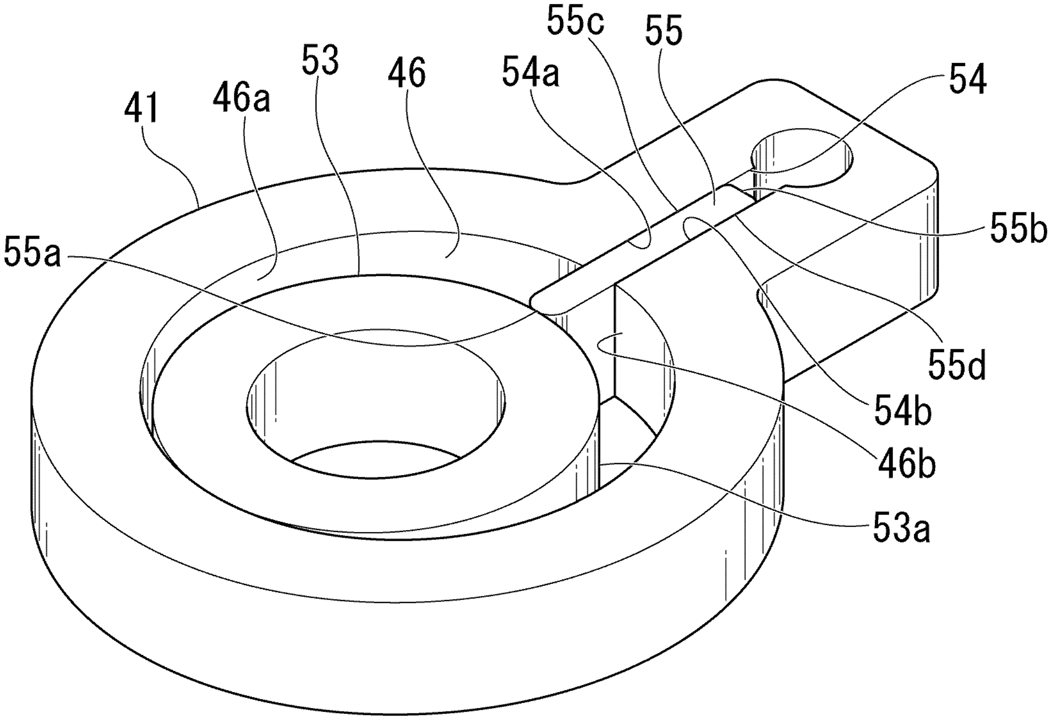
FIG. 3 is a perspective view of a cylinder, a roller, and a blade of the compressor of FIG. 1.

As shown in FIGS. 2 and 3, a blade groove 54 recessed outward in the radial direction is formed at part of the cylinder 41 in the circumferential direction. The blade groove 54 is formed throughout the entirety of the cylinder 41 in the axial direction (height direction). The blade groove 54 is in communication with the inside of the sealed container 34 on the outer end in the radial direction.

A blade 55 is provided in the blade groove 54. The blade 55 is configured to be slidably movable in the radial direction with respect to the cylinder 41. As shown in FIG. 1, the blade 55 is biased inward in the radial direction by a biasing means 57 on a back surface 55*b* that is an outer end surface in the radial direction. As shown in FIGS. 2 and 3, the blade 55 is in contact with the outer peripheral surface 53*a* of the roller 53 in the cylinder chamber 46, on a front-end surface 55*a* that is an inner end surface in the radial direction. Consequently, the blade 55 is configured to be able to move forward and backward in the cylinder chamber 46 in accordance with the eccentric rotation of the roller 53. The cylinder chamber 46 is separated into a suction chamber 46*a* and a compression chamber 46*b* by the roller 53 and the blade 55. Note that, in a plan view viewed from the axial direction, the front-end surface 55*a* of the blade 55 is formed in a projected arc shape directed inward in the radial direction.

The refrigerant oil J is intervened between the blade 55 and inner surfaces 54*a* and 54*b* of the blade groove 54, between the blade 55 and a lower surface 42*a* of the main bearing 42, and between the blade 55 and an upper surface 43*a* of the sub bearing 43.

A suction hole 56 penetrating the cylinder 41 in the radial direction is formed at a portion located at the forward side (the left side of the blade groove 54 in FIG. 2) of the cylinder 41 in the rotation direction (refer to the arrow in FIG. 2) of the roller 53 with respect to the blade groove 54. The outer end of the suction hole 56 in the radial direction is connected to the suction pipe 21 (refer to FIG. 1). The inner side of the suction hole 56 in the radial direction opens at the suction chamber 46*a* of the cylinder chamber 46. A discharge groove 58 is formed at a portion located at the backward side (the right side of the blade groove 54 in FIG. 2) of the blade groove 54 along the rotation direction of the roller 53 in the cylinder 41. The discharge groove 58 is formed in a semicircular shape in a plan view viewed from the axial direction. The discharge groove 58 opens at at least an upper surface of the cylinder 41.

As shown in FIG. 1, the main bearing 42 closes an upper opening end portion of the cylinder 41. The main bearing 42 rotatably supports a portion of the rotation axis 31 located above the cylinder 41. Particularly, the main bearing 42 includes: a tubular portion 61 into which the rotation axis 31 is inserted; and a flange portion 62 provided to protrude outward in the radial direction from a lower end of the tubular portion 61.

As shown in FIGS. 1 and 2, a discharge hole 64 penetrating the flange portion 62 in the axial direction is formed at a part of the flange portion 62 in the circumferential direction (refer to FIG. 2). The discharge hole 64 is in communication with the inside of the cylinder chamber 46 through the discharge groove 58. Note that, the flange portion 62 is provided with a discharge valve mechanism not shown in the drawings, which opens and closes the discharge hole 64 with an increase in pressure inside the cylinder chamber 46 (the compression chamber 46*b*) and discharges the refrigerant to the outside of the cylinder chamber 46.

The main bearing 42 is provided with a muffler 65 that covers the main bearing 42 from above. The muffler 65 has a communicating hole 66 formed therein which is in communication with the inside and the outside of the muffler 65. The high-temperature and high-pressure gaseous refrigerant discharged through the discharge hole 64 is discharged to the inside of the sealed container 34 through the communicating hole 66. The sub bearing 43 closes a lower opening end portion of the cylinder 41. The sub bearing 43 rotatably supports a portion of the rotation axis 31 located blow the cylinder 41. Specifically, the sub bearing 43 includes: a tubular portion 71 into which the rotation axis 31 is inserted; and a flange portion 72 provided to protrude outward in the radial direction from an upper end of the tubular portion 71.

In the compressor 2, when power is supplied to the stator 35 of the motor part 32, the rotation axis 31 rotates around the axis line O with the rotor 36. Consequently, the eccentric portion 51 and the roller 53 eccentrically rotate in the cylinder chamber 46 in accordance with the rotation of the rotation axis 31. At this time, the outer peripheral surface 53*a* of the roller 53 comes into frictional contact with the inner peripheral surface 41*a* of the cylinder 41 via the refrigerant oil coating. Accordingly, the gaseous refrigerant is taken into the cylinder chamber 46 through the suction pipe 21, and the gaseous refrigerant taken into the cylinder chamber 46 is compressed.

Particularly, in the cylinder chamber 46, the gaseous refrigerant is suctioned into the suction chamber 46*a* through the suction hole 56, and the gaseous refrigerant suctioned from the suction hole 56 in advance is compressed in the compression chamber 46*b*. The compressed gaseous refrigerant is discharged to the outside of the cylinder chamber 46 (the inside of the muffler 65) through the discharge hole 64 of the main bearing 42 and thereafter discharged to the inside of the sealed container 34 through the communicating hole 66 of the muffler 65. Note that, the gaseous refrigerant discharged to the inside of the sealed container 34 is fed into the condenser 3.

In the compression mechanism part 33 of the compressor 2, the blade 55 and the roller 53 slidingly move relative to each other in a state in which the front-end surface 55*a* of the blade 55 is in contact with the outer peripheral surface 53*a* of the roller 53. The blade 55 and the cylinder 41 slidingly move relative to each other in a state in which both side surfaces 55*c* and 55*d* of the blade 55 are in contact with the inner surfaces 54*a* and 54*b* of the blade groove 54. The blade 55 and the main bearing 42 slidingly move relative to each other in a state in which an upper end surface 55*e* of the blade 55 is in contact with the lower surface 42*a* of the main bearing 42. The blade 55 and the sub bearing 43 slidingly move relative to each other in a state in which a lower end surface 55*f* of the blade 55 is in contact with the upper surface 43*a* of the sub bearing 43.

Hereinafter, an example in which the first member is the blade 55 and the second member is the roller 53 will be described. In the rotary compressor 2 such as the embodiment, the sliding conditions are severe and the most likely to generate heat is the sliding portion between the blade and the roller. Because of this, by applying the features of the embodiment to the compressor 2 such that the first member is used as the blade 55 and the second member is used as the roller 53, it has particularly exceptional in long-term reliability. Note that, the blade 55 may serve as the first member, the cylinder 41 may serve as the second member, the blade 55 may serve as the first member, the main bearing 42 may serve as the second member, the blade 55 may serve as the first member, and the sub bearing 43 may serve as the second member. Also, a mode may be adopted in which these are combined.

The compression mechanism part 33 includes Cr. In the compression mechanism part 33, is preferable that a base member of the first member include Cr since it has exceptional abrasion resistance. For example, a steel material including Cr (for example, SKH material such as SKH51 or the like) may be shown as a material of the base member of the blade 55. A special alloy cast iron (monitor cast iron) obtained by adding Mo, Ni, Cr, or the like to the gray cast iron of FC250 may be shown as a material of a base member of the roller 53. The gray cast iron of FC250 or the like may be shown as materials of the cylinder 41, the main bearing 42, and the sub bearing 43.

Figure 4:
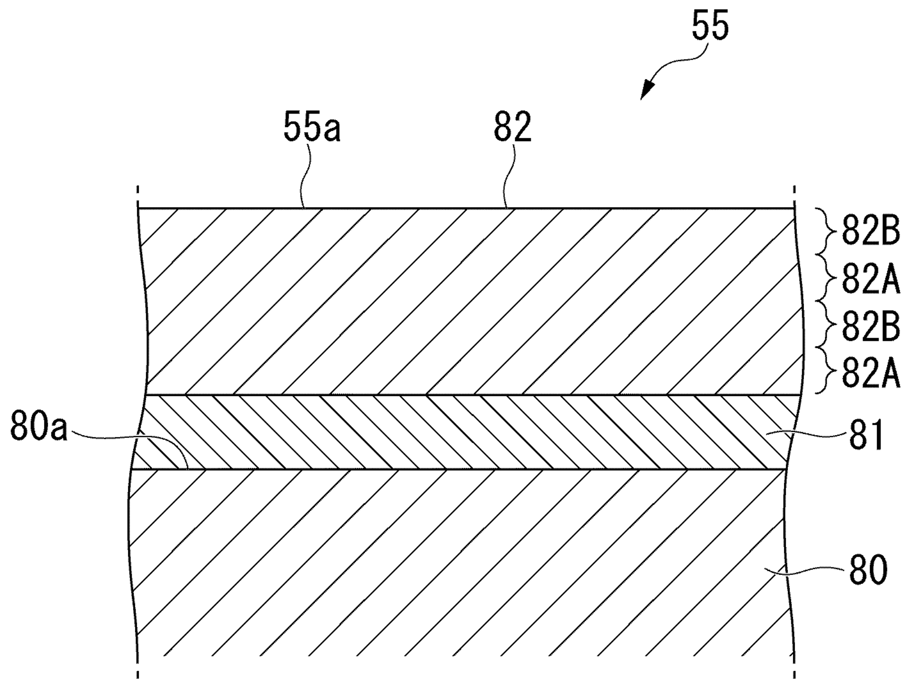
FIG. 4 is an enlarged cross-sectional view showing a front-end surface side of the blade.

As shown in FIG. 4, a chromium layer 81 and a nitride layer 82 present on the chromium layer 81 are formed on a top surface 80*a* of a base member 80 of the side on the front-end surface 55*a* of the blade (first member) 55. The base member 80 of the blade 55 includes Cr. For this reason, adhesion between the base member 80 and the chromium layer 81 is exceptional.

It is preferable that the chromium layer 81 be formed of a layer made of only Cr since adhesion with respect to the base member 80 is excellent. Note that, if the effect of the embodiment is not impaired, the chromium layer 81 may include components other than Cr such as Ti or the like. The chromium layer 81 is a region not including nitride.

It is preferable that the thickness of the chromium layer 81 be the order of several nm to 1.0 μm or less. The chromium layer 81 is a layer for improving adhesion as an intermediate layer between the base member 80 and the nitride layer 82. If the chromium layer 81 is too thick, it causes delamination, especially when thicker than 1.0 μm, causes the nitride layer 82 to peel. Therefore, it is preferable to be 1.0 μm or less.

The nitride layer 82 is a layer including CrN and TiN. The nitride layer 82 includes TiN having a coefficient of thermal conductivity with CrN to allow heat generation due to sliding of the blade (first member) 55 and the roller (second member) 53 to dissipate. As a result, occurrence of decomposition due to an excessive increase in temperature of the refrigerant by the sliding is suppressed.

It is preferable that the nitride layer 82 be a layer formed of only CrN and TiN since it is likely to suppress heat decomposition of the refrigerant and reduction in lubricity of the refrigerant oil.

It is preferable that regions 82A each having CrN greater than TiN and regions 82B each having TiN greater than CrN be alternately present in a thickness direction of the nitride layer 82. The nitride layer 82 having the above-described mode can be formed by, for example, a PVD (Physical Vapor Deposition) process of carrying out vacuum deposition which rotates the blade 55 serving as the first member between CrN and TiN disposed as vapor deposition materials while causing the front-end surface 55*a* of the blade 55 to alternately face the CrN side and the TiN side. The lattice constant of CrN is 0.41 nm, the lattice constant of TiN is 0.42 nm, which are equivalent in lattice constant. Therefore, the distortion of the boundary portion between the region 82A and the region 82B is small, and the nitride layer 82 having a thickness of 3 μm or more is also excellent in peeling resistance and adhesion. As stated above, the blade 55 has excellent adhesion between the base member 80 including Cr and the chromium layer 81 and also has exceptional adhesion with respect to the nitride layer 82, and therefore has excellent abrasion resistance.

In the case in which the regions 82A and the regions 82B are alternately present in the thickness direction of the nitride layer 82, the numbers of the regions 82A and the regions 82B are not particularly limited.

Additionally, the thickness of each layer (concentration layer) of the regions 82A and 82B may not uniform and may have variations. When there is a difference in the film thickness and concentration of each of layers, the adhesion between the films becomes strong and hardly peeled off.

The proportion of TiN to the total amount of CrN and TiN is preferably from 40% by mass to 60% by mass, particularly 50% by mass or less. If the proportion of TiN is 50% by mass or less, the increase in the amount of abrasion of the counterpart sliding member is further suppressed, and it is easy to suppress the heat decomposition of the refrigerant and the deterioration of the lubricity of the refrigerant oil.

Furthermore, the proportion of TiN to the total amount of CrN and TiN is 40% by mass or more, the abrasion resistance of the blade 55 is also improved.

It is preferable that the thickness of the nitride layer 82 be from 1.0 μm to 5.0 μm. If the thickness of the nitride layer 82 is greater than or equal to the lower limit, abrasion resistance can be ensured even in long-term use. If the thickness of the nitride layer 82 is less than or equal to the upper limit, peeling due to an increase in internal stress can be prevented. The lower limit of the thickness of the nitride layer 82 is more preferably 1.5 μm or more, more preferably 2.0 μm or more. The upper limit of the thickness of the nitride layer 82 is more preferably 4.5 μm or less, more preferably 4.0 μm or less.

The total thickness of the chromium layer 81 and the nitride layer 82 is preferably 1.0 μm or more and 5.5 μm or less. If the total thickness is greater than or equal to the lower limit, abrasion resistance can be ensured. If the total thickness is less than or equal to the upper limit, peeling due to an increase in internal stress can be prevented. The lower limit of the total thickness is more preferably 2.0 μm or more, more preferably 3.0 μm or more. The upper limit of the total thickness is more preferably 5.0 μm or less, more preferably 4.0 μm or less.

It is preferable that the carbide be deposited on the outer peripheral surface 53*a* of the roller (second member) 53. As a hard carbide is deposited on the surface, it is possible to ensure abrasion resistance of the blade (first member) 55 with respect to the nitride layer 82.

Examples of refrigerants include, but are not limited to, carbon dioxide, saturated hydrocarbon not including chlorine, unsaturated saturated hydrocarbon not including chlorine, saturated fluorinated hydrocarbon, unsaturated fluorinated hydrocarbon, and fluorine-containing ether. One type of refrigerant may be used alone, and two or more types may be used in combination.

Although unsaturated refrigerant including double bonds have lower chemical stability than those of other refrigerants, in embodiment, even when unsaturated refrigerant are used, decomposition of the refrigerant due to the sliding heat generation can be suppressed. Consequently, in embodiment, it is suitable to a case of using an unsaturated refrigerant or a mixed refrigerant including an unsaturated refrigerant as the refrigerant.

Furthermore, in a case of using carbon dioxide as the refrigerant, since it is under the high-temperature and high-pressure environment, the refrigerant oil J of the compression mechanism part 33 tends to reduce viscosity due to temperature and tends to reduce lubricity. However, since the temperature rise due to the sliding heat generation of the first member and the second member can be suppressed in the embodiment, the increase in abrasion due to the viscosity reduction of the refrigerant oil J can be suppressed, and the reliability is exceptional. For this reason, in the embodiment, it is also preferable to use carbon dioxide or a mixed refrigerant including carbon dioxide as the refrigerant.

Specific examples of refrigerants include propane, propylene, normal butane, 2-methylbutane, isobutane, refrigerant carbon dioxide (R744), HFC23, HFC32, HFC125, HFC134a, HFC143a, HFC236fa, HFC410A (R410A), HFO1225ye, HFO1233zd, HFO1233yd, HFO1234yf, HFO1234ze, HFO1234ye, HFO1243zf, HFE245mc, and HFE143m.

Refrigerant oils are not particularly limited, for example, mineral oils, ester oils, polyol ester oils, polyvinyl ether oils, alkylene glycol oils, poly α-olefine oilss, or the like. One type of refrigerant oil may be used alone, and two or more types may be used in combination. It is desirable for the refrigerant oil to not add a friction inhibitor including phosphorus, but may also be added. Specific examples of friction inhibitors are tricresyl phosphate (TCP).

In a case of adding the friction inhibitor including phosphorus, a reaction film is formed on the top surface of the sliding surface by the abrasion inhibitor depending on conditions such as temperature, pressure, or the like, and it causes an increase in coefficient of friction. Accordingly, sliding performance is reduced, and abrasion due to oil exhaustion may be promoted. Therefore, it may be preferable not to add a friction inhibitor including phosphorus.

As described above, according to the embodiment, by forming the chromium layer and the nitride layer on the base member surface of the first member, the heat generation due to sliding between the first member and the second member can be reduced. Consequently, it is possible to suppress the degradation of lubricating performance due to the heat decomposition of the refrigerant or the viscosity reduction of the lubricating oil. Moreover, since the chromium layer and the nitride layer formed on the base member surface of the first member have excellent adhesion, excellent abrasion resistance can be obtained. Therefore, an excellent reliable compressor can be realized for a long period of time.

While an embodiment has been described, the embodiment has been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Hereinafter, the invention will be described in detail with reference to Examples, but the invention is not limited by the following description.

EXAMPLE

As a compressor 2 according to the Example, the first member was a blade 55 and the second member was a roller 53. A SKH51 (hardness HRC 63) containing 4 mass % Cr was used for a substrate 80 of the blade 55 serving as the first member. In the PVD process, a chromium layer and a nitride layer were sequentially formed on a surface 80*a* of the substrate 80 of the side on the front-end surface 55*a*. In the thickness direction of the nitride layer, regions 82A each having CrN greater than TiN and regions 82B each having TiN greater than CrN be alternately formed. The proportion of TiN to the total amount of CrN and TiN was 50% by weight. The thickness of the chromium layer was 0.1 μm or less, the thickness of the nitride layer was 3.0 μm, and the total thickness thereof was approximately 3.0 μm. The material of the roller 53 serving as the second member was a monitor cast iron (HRC 50) including 0.8% by mass of Cr. The amount of carbide deposited on the outer peripheral surface 53*a* of the roller 53 was 4% by mass. The following evaluation tests were carried out using the compressor 2 including the blade 55 and the roller 53 described above. As the refrigerant, a polyalkylene glycol oil was used as the refrigerant oil using R744 ($CO_2$) with a higher refrigerant oil temperature (or discharge temperature) compared to other refrigerants. As the operating conditions under the tests, the temperature (or discharge temperature) of the refrigerant oil was 130° C., the suction pressure was 3.6 MPa, and the discharge pressure was 11.5 MPa.

Under the above configuration and conditions, the amount of abrasion of the blade after operating for 1000 hours was evaluated in Example 1. Note that, an abrasion inhibitor including phosphorus such as tricresyl phosphate (TCP) or the like was added.

In Example 2, the substantially same configuration and conditions as those of Example 1 were adopted, and the amount of abrasion after 2000 hours of operation was evaluated without the addition of an abrasion inhibitor as a different condition.

In Example 3, in order to compare Example 2, an abrasion inhibitor including phosphorus such as tricresyl phosphate (TCP) or the like was added as a different condition, and the amount of abrasion after 2000 hours of operation was evaluated.

Comparative Example 1

The evaluation test was carried out in a manner similar to Example 1 except for using a diamond-like carbon (DLC) film having a thickness of 3 μm formed on the surface 80*a* of the substrate 80 of the side on the front-end surface 55*a* as the blade 55.

(Evaluation Test)

As an evaluation test, a single endurance test of the compressor was carried out and evaluated on the following standard.

"1": The blade abrasion amount is less than or equal to 1 μm.

"2": The blade abrasion amount is greater than 1 μm.

The evaluation results of Examples 1, 2, and 3, and Comparative Example 1 are shown in Table 1.

TABLE 1

| | SURFACE TREATMENT OF BLADE | MATERIAL OF ROLLER | REFRIGERANT OIL TYPE | REFRIGERANT OIL TEMPERATURE [° C.] | OPERATION HOURS [h] | EVALUATION RESULT |
|---|---|---|---|---|---|---|
| COMPARATIVE EXAMPLE 1 | DLC FILM | MONITOR CAST IRON | PAG (FRICTION INHIBITOR IS PRESENT) | 130 | 1000 | 2 |
| EXAMPLE 1 | CHROMIUM LAYER + NITRIDE LAYER | MONITOR CAST IRON | PAG (FRICTION INHIBITOR IS PRESENT) | 130 | 1000 | 1 |
| EXAMPLE 2 | CHROMIUM LAYER + NITRIDE LAYER | MONITOR CAST IRON | PAG (FRICTION INHIBITOR IS PRESENT) | 130 | 2000 | 1 |
| EXAMPLE 3 | CHROMIUM LAYER + NITRIDE LAYER | MONITOR CAST IRON | PAG (FRICTION INHIBITOR IS PRESENT) | 130 | 2000 | 2 |

As shown in Table 1, in Example 1 in which the chromium layer and the nitride layer were formed on the base member surface of the blade serving as the first member, abrasion of the blade was suppressed. In Comparative Example 1 in which the DLC film was formed on the base member surface of the blade, the abrasion of the blade was not sufficiently suppressed. In the configuration of Comparative Example 1, although the amount of abrasion was suppressed in the case in which the temperature of the refrigerator oil was lower, the amount of abrasion was not sufficiently suppressed in the case in which the temperature of the refrigerant oil was at a high temperature of 130° C.; in comparison to this, in the case of Example 1, the amount of abrasion can be suppressed without problems even at a high temperature of 130° C. in the case of Example 1.

In the case of Example 2 in which the abrasion inhibitor was not added, the amount of abrasion can be sufficiently suppressed even in long-term operation of 130° C. and 2000 hours as compared to the case of Example 3 to which the abrasion inhibitor was added.

What is claimed is:

1. A compressor comprising a compression mechanism part that compresses a refrigerant in a sealed container, wherein the compression mechanism part includes a first member and a second member which slidingly move relative to each other, the first member has a chromium layer and a nitride layer formed on a base member surface in this order, the nitride layer includes CrN and TiN, carbide is deposited on a surface of the second member, and a region having CrN greater than TiN and a region having TiN greater than CrN are alternately present in a thickness direction of the nitride layer.

2. The compressor according to claim 1, wherein the refrigerant is an unsaturated refrigerant or a mixed refrigerant including an unsaturated refrigerant.

3. The compressor according to claim 1, wherein the refrigerant is carbon dioxide or a mixed refrigerant including carbon dioxide.

4. The compressor according to claim 1, wherein the compressor is a rotary compressor in which the first member is a blade and the second member is a roller.

* * * * *